(12) United States Patent
Aichele et al.

(10) Patent No.: US 12,311,696 B1
(45) Date of Patent: May 27, 2025

(54) WHEEL WEIGHT SYSTEM FOR AN AGRICULTURAL VEHICLE

(71) Applicant: CNH Industrial America LLC, New Holland, PA (US)

(72) Inventors: Calvin Joshua Aichele, West Fargo, ND (US); John T. Rasset, Barnesville, MN (US); Kenneth James Bolte, Fargo, ND (US); Keith Richard Fuhrman, Minooka, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 18/501,616

(22) Filed: Nov. 3, 2023

(51) Int. Cl.
*B60B 15/28* (2006.01)

(52) U.S. Cl.
CPC ......... *B60B 15/28* (2013.01); *B60Y 2200/221* (2013.01)

(58) Field of Classification Search
CPC .......................... B60B 15/28; B60Y 2200/221
See application file for complete search history.

(56) References Cited

U.S. PATENT DOCUMENTS

| | | | |
|---|---|---|---|
| 2,243,380 A | 5/1941 | Kinney | |
| 2,859,065 A * | 11/1958 | Darby | B60B 15/28 301/53.5 |
| 5,116,106 A | 5/1992 | Hardesty et al. | |
| 7,182,409 B2 | 2/2007 | Thomas et al. | |
| 8,944,521 B2 * | 2/2015 | Roth | B60B 15/28 301/53.5 |
| 9,752,647 B2 * | 9/2017 | Röckl | F16F 15/324 |
| 10,457,092 B2 * | 10/2019 | Bhosale | B60B 15/28 |
| 10,899,170 B2 * | 1/2021 | Letscher | B60B 15/28 |
| 2018/0281512 A1 | 10/2018 | Letscher et al. | |

FOREIGN PATENT DOCUMENTS

| | | | |
|---|---|---|---|
| CN | 105398283 A | 3/2016 | |
| EP | 2033808 A1 | 3/2009 | |
| EP | 3266622 A1 | 1/2018 | |
| WO | WO-2023084326 A1 * | 5/2023 | ............. B60B 15/28 |

OTHER PUBLICATIONS

John Deere, Weight, Rear Wheel 106 lb (48kg), RDO Equipment Company, 1 page. Retrieved from https://www.rdoequipment.com/product-details/john-deere-weight-rear-wheel-106-lb-48-kg-t19293/?utm_source=google_shopping&utm_medium=organic&utm_campaign=Weight,%20Rear%20Wheel%20106%20lb%20.

* cited by examiner

*Primary Examiner* — Faye M Fleming
(74) *Attorney, Agent, or Firm* — Rickard K. DeMille; Rebecca L. Henkel; Peter K. Zacharias

(57) ABSTRACT

A wheel weight system for an agricultural vehicle includes a base couplable to a wheel and a ballast weight couplable to the base. The base and the ballast weight each defines a through-hole extending along a rotational axis. One side of the base has a base centering portion extending outwardly from a base end face portion and tapering radially inwardly, the base centering portion defining a centering portion cutout. One side of the ballast weight defines a ballast cutout face spaced apart along the rotational axis from a ballast end contact face configured to contact the base end face portion. The centering portion cutout of the base at least partially circumferentially aligns with the ballast cutout face about the rotational axis such that debris radially exits the through-holes from between the centering portion cutout and the ballast cutout face.

20 Claims, 8 Drawing Sheets

WHEEL WEIGHT SYSTEM FOR AN AGRICULTURAL VEHICLE

FIELD OF THE INVENTION

The present disclosure relates generally to agricultural vehicles and, more particularly, to wheel weight systems for attaching wheel weights to wheels of agricultural vehicles.

BACKGROUND OF THE INVENTION

In some instances, ballast weights may be added to individual wheels or at an end of the chassis of an agricultural vehicle (e.g., tractor) to improve the performance and/or efficiency of the tractor during different tasks. However, different tasks may require different ballast configurations. For instance, when transporting the tractor on a road, it may be beneficial to remove as much weight from the tractor as possible, particularly when using the tractor to haul a trailer or implement with trailer brakes. Conversely, when working in the field, particularly over rough or uneven terrain, it may be beneficial to add weight to lower the center of gravity of the tractor and reduce slip (increase traction), and thus, increase stability, control, and efficiency. Typical ballast wheel weight attachment configurations require access to both sides of each wheel, which may be difficult for an operator to add or remove ballast wheel weights without removing the wheels, and time consuming if the wheels need to be removed to change the ballast configuration.

Accordingly, an improved wheel weight system for an agricultural vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a wheel weight system for an agricultural vehicle. The wheel weight system may include a base configured to be coupled to a wheel of the agricultural vehicle and a ballast weight configured to be coupled to the base. More particularly, the base may extend between a first base side and a second base side along a rotational axis and may define a base through-hole extending along the rotational axis. The first base side may be configured to rest against the wheel. The second base side may have a base end face portion and a base centering portion, with the base centering portion extending outwardly along the rotational axis from the base end face portion to a centering end and tapering radially inwardly from the base end face portion. The base centering portion may also define a centering portion cutout. The ballast weight may similarly extend between a first ballast side and a second ballast side along the rotational axis and define a ballast through-hole extending along the rotational axis. The first ballast side may define a ballast end contact face and a ballast cutout face, where the ballast cutout face may be spaced apart from the ballast end contact face along the rotational axis towards the second ballast side. Advantageously, the ballast weight may be configured to at least partially receive the base centering portion of the base such that the base through-hole and the ballast through-hole are aligned along the rotational axis and the centering portion cutout of the base is at least partially aligned with the ballast cutout face circumferentially about the rotational axis to allow debris to exit the base through-hole and the ballast through-hole along a radial direction between the centering portion cutout and the ballast cutout face.

In another aspect, the present subject matter is directed to an agricultural vehicle. Particularly, the agricultural vehicle may include a chassis and a wheel supporting the chassis, the wheel having a wheel center rotatably coupling the wheel to the chassis for rotation about a rotational axis. The agricultural vehicle may further include a base configured to be coupled to the wheel center and a ballast weight configured to be coupled to the base. More particularly, the base may extend between a first base side and a second base side along the rotational axis and may define a base through-hole extending along the rotational axis. The first base side may be configured to rest against the wheel center. The second base side may have a base end face portion and a base centering portion, with the base centering portion extending outwardly along the rotational axis from the base end face portion to a centering end and tapering radially inwardly from the base end face portion. The base centering portion may also define a centering portion cutout. The ballast weight may similarly extend between a first ballast side and a second ballast side along the rotational axis and define a ballast through-hole extending along the rotational axis. The first ballast side may define a ballast end contact face and a ballast cutout face, where the ballast cutout face may be spaced apart from the ballast end contact face along the rotational axis towards the second ballast side. Advantageously, the ballast weight may be configured to at least partially receive the base centering portion of the base such that the base through-hole and the ballast through-hole are aligned along the rotational axis and the centering portion cutout of the base is at least partially aligned with the ballast cutout face circumferentially about the rotational axis to allow debris to exit the base through-hole and the ballast through-hole along a radial direction between the centering portion cutout and the ballast cutout face.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
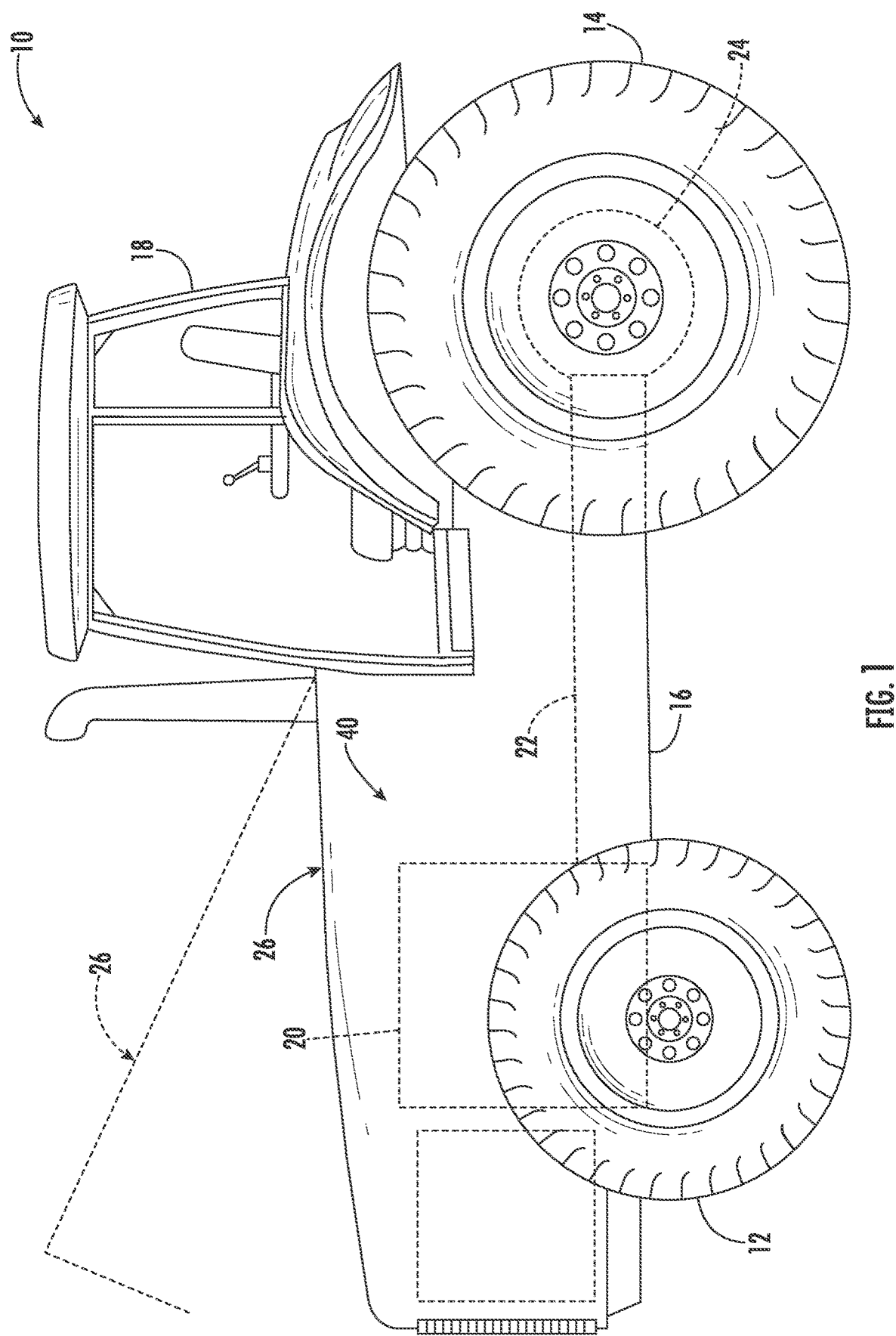
FIG. 1 illustrates a side view of one embodiment of an agricultural work vehicle in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein will be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone: B alone: C alone: A and B in combination: A and C in combination: B and C in combination; or A, B, and C in combination.

In general, the present subject matter is directed to wheel weight systems for attaching wheel weights to wheels of agricultural vehicles. Specifically, in several embodiments, the wheel weight system includes a base and a ballast weight, where the base is configured to be coupled to a wheel center of a wheel of an agricultural vehicle and the ballast weight is configured to be coupled to the base. More particularly, the base is couplable to the wheel center, along an exterior facing side of the wheel center, such that the ballast weight may be easily coupled and uncoupled from the base without removing the wheel from the agricultural vehicle. The base has one or more features for aligning the ballast weight. For instance, the base has a centering portion extending outwardly from a side of the base facing away from the wheel center, where the centering portion may be at least partially received by a central portion of the ballast weight such that through-holes of the base and the ballast weight are centered on and extend along a rotational axis of the wheel. In a particularly advantageous manner, the centering portion of the base has one or more cutouts which at least partially align with cutouts on a side of the ballast weight facing the base such that dirt and other field materials typically caught in the through-holes of the base and the ballast weight, may exit the through-holes from between the base and the ballast weight via the aligned cutouts in the base and the ballast weight. Similarly, the side of the base facing the wheel center may also have cutouts which allow dirt and other field materials typically trapped inside of the through-hole in the base against the wheel center, to exit via the cutouts from between the base and the wheel center.

Referring now to the drawings, FIG. 1 illustrates one embodiment of a work vehicle 10 in accordance with aspects of the present subject matter. In particular, FIG. 1 illustrates a side view of the work vehicle 10. It should be appreciated that, although the work vehicle 10 illustrated herein is configured as an agricultural tractor, the work vehicle 10 may generally be configured as any suitable work vehicle known in the art, such as various other agricultural vehicles, earth-moving vehicles, road vehicles, loaders and/or the like.

As shown in FIG. 1, the work vehicle 10 includes a pair of front wheels 12, a pair of rear wheels 14, and a chassis or frame 16 coupled to and supported by the wheels 12, 14. An operator's cab 18 may be supported by a portion of the frame 16 and may house various control devices (not shown) for permitting an operator to control the operation of the work vehicle 10. Additionally, the work vehicle 10 may include an engine 20 and a transmission 22 mounted on the frame 16. The transmission 22 may be operably coupled to the engine 20 and may provide variably adjusted gear ratios for transferring engine power to the wheels 12, 14 via a differential 24. In some embodiments, the work vehicle 10 is configured as a four-wheel drive vehicle, where the front and rear wheels 12, 14 are all driven by the engine 20 and transmission 22. However, in other embodiments, the work vehicle 10 is configured as a two-wheel drive, where only the front wheels 12 or only the rear wheels 14 are driven by the engine 20 and transmission 22.

The work vehicle 10 may also include a hood 26 configured to least partially surround and/or cover the various under-hood components stored within the vehicle's engine compartment 40, such as the engine 20 and any other suitable under-hood components (e.g., hydraulic components, pneumatic components, electrical components, mechanical component(s), storage tank(s), etc.). As particularly shown in FIG. 1, the hood 26 may be configured to be pivotally coupled to a portion of the work vehicle 10 at or adjacent to its aft or rear end such that the hood 26 can be pivoted about the aft end between a closed position (shown in solid lines in FIG. 1) and an opened position (shown in dashed lines in FIG. 1).

The work vehicle 10 may be configured to tow an implement. As such, the work vehicle 10 may additionally include a hitch or draw bar assembly at the aft or rear end of the work vehicle relative to a forward direction of travel, the draw bar assembly being supported by the frame 16 (e.g., near a rear axle of the rear wheels 14).

As will be described in greater detail below, to improve the performance and/or efficiency of the tractor during different tasks (working in fields with rough and/or uneven terrain, transporting the tractor on a road when towing a trailer with trailer brakes, etc.), it may be beneficial to add wheel weights to certain wheels of the tractor. Typical wheel weight attachment configurations require access to both the exterior-facing and interior-facing sides of a wheel, which may make it difficult for an operator to add or remove weight weights without removing the wheel, and time consuming if the wheel needs to be removed to change the ballast configuration. Further, it may be difficult to align the wheel weight during mounting. Thus, in accordance with aspects of the present subject matter, an improved wheel weight system that addresses one or more of these issues is discussed below.

Figure 2:
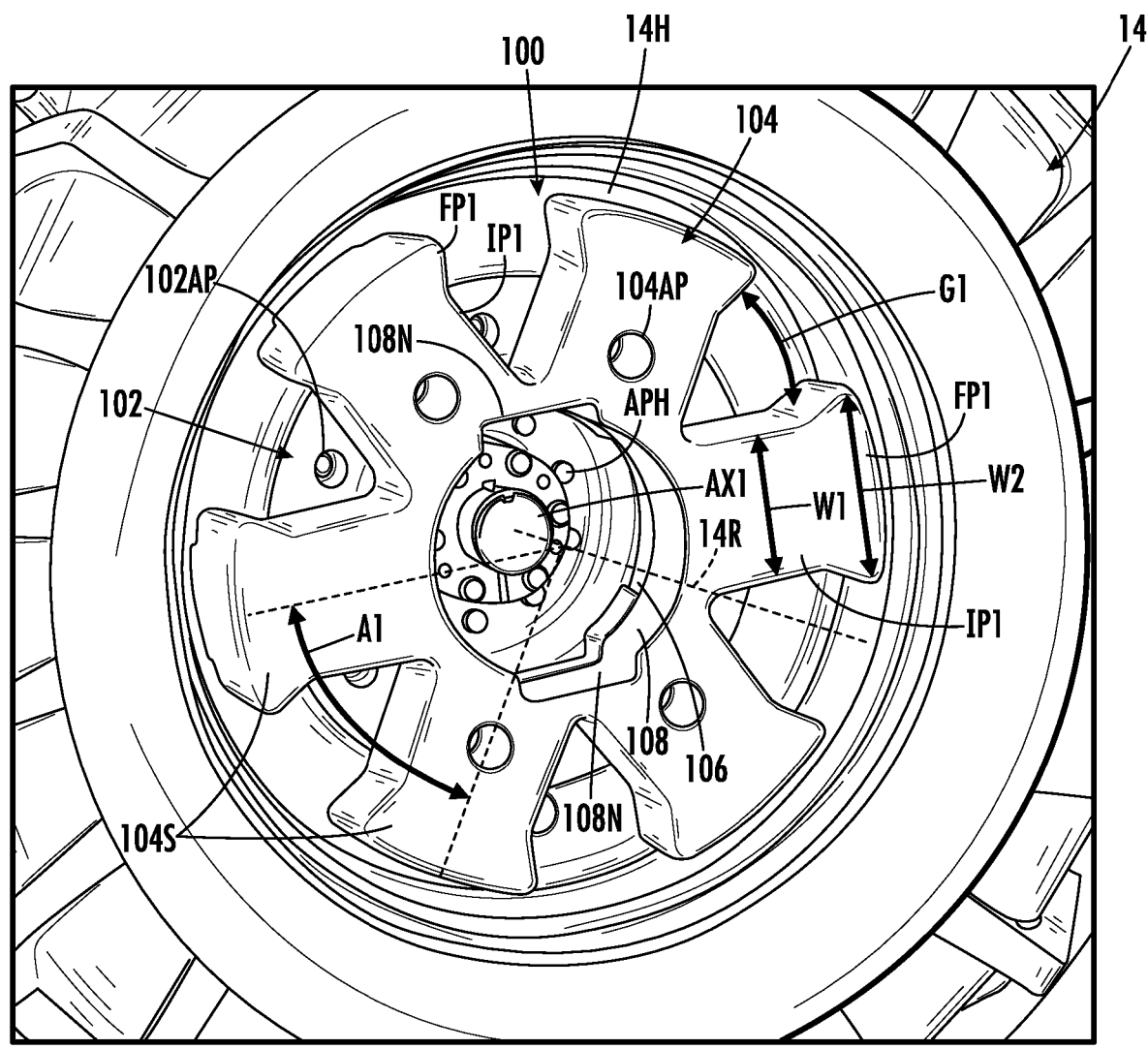
FIG. 2 illustrates a perspective view of a wheel weight system attached to a wheel of an agricultural work vehicle in accordance with aspects of the present subject matter.
Figure 3:
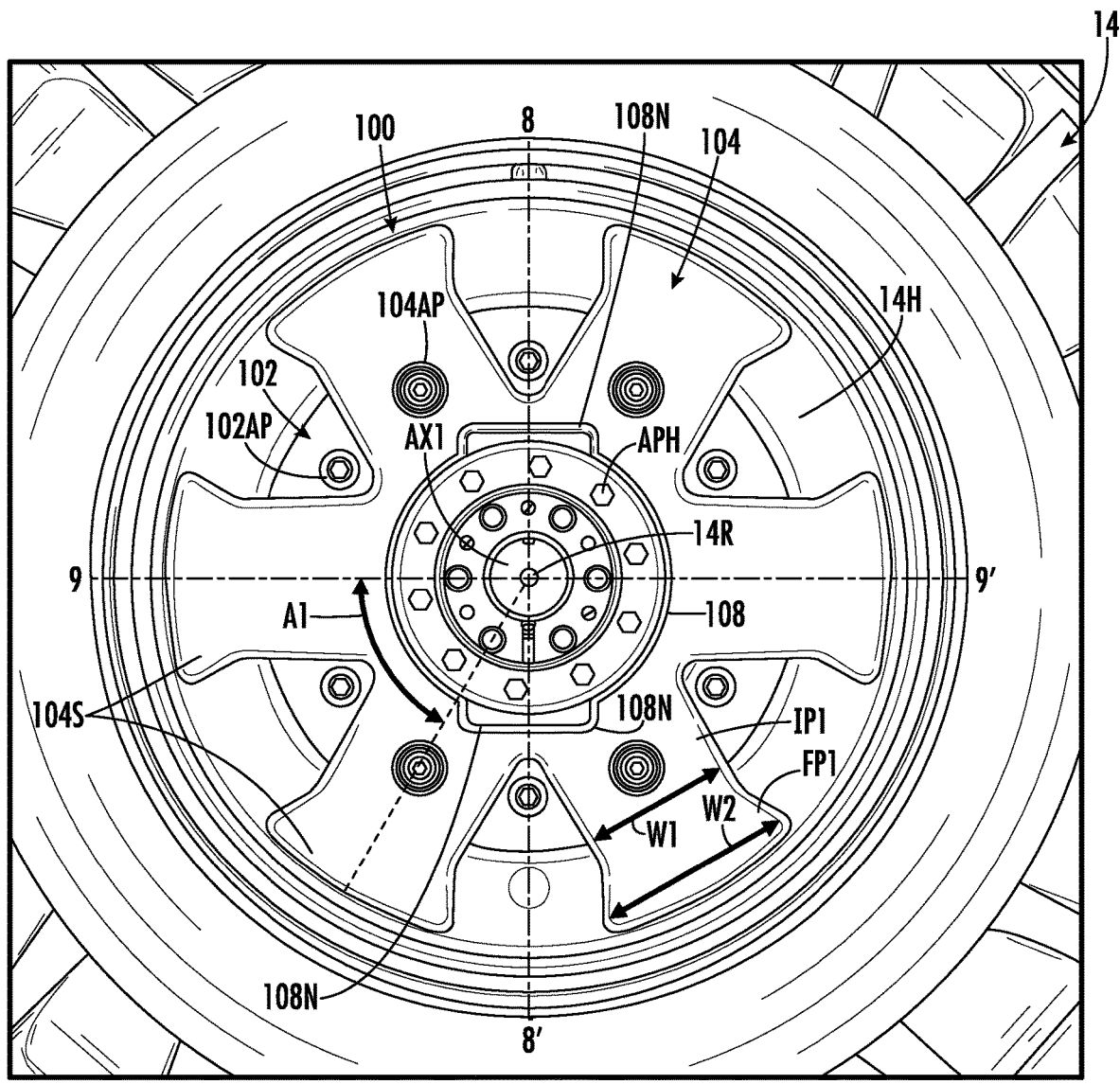
FIG. 3 illustrates a front view of the wheel weight system shown in FIG. 2 attached to the wheel of the agricultural work vehicle in accordance with aspects of the present subject matter.
Figure 4:
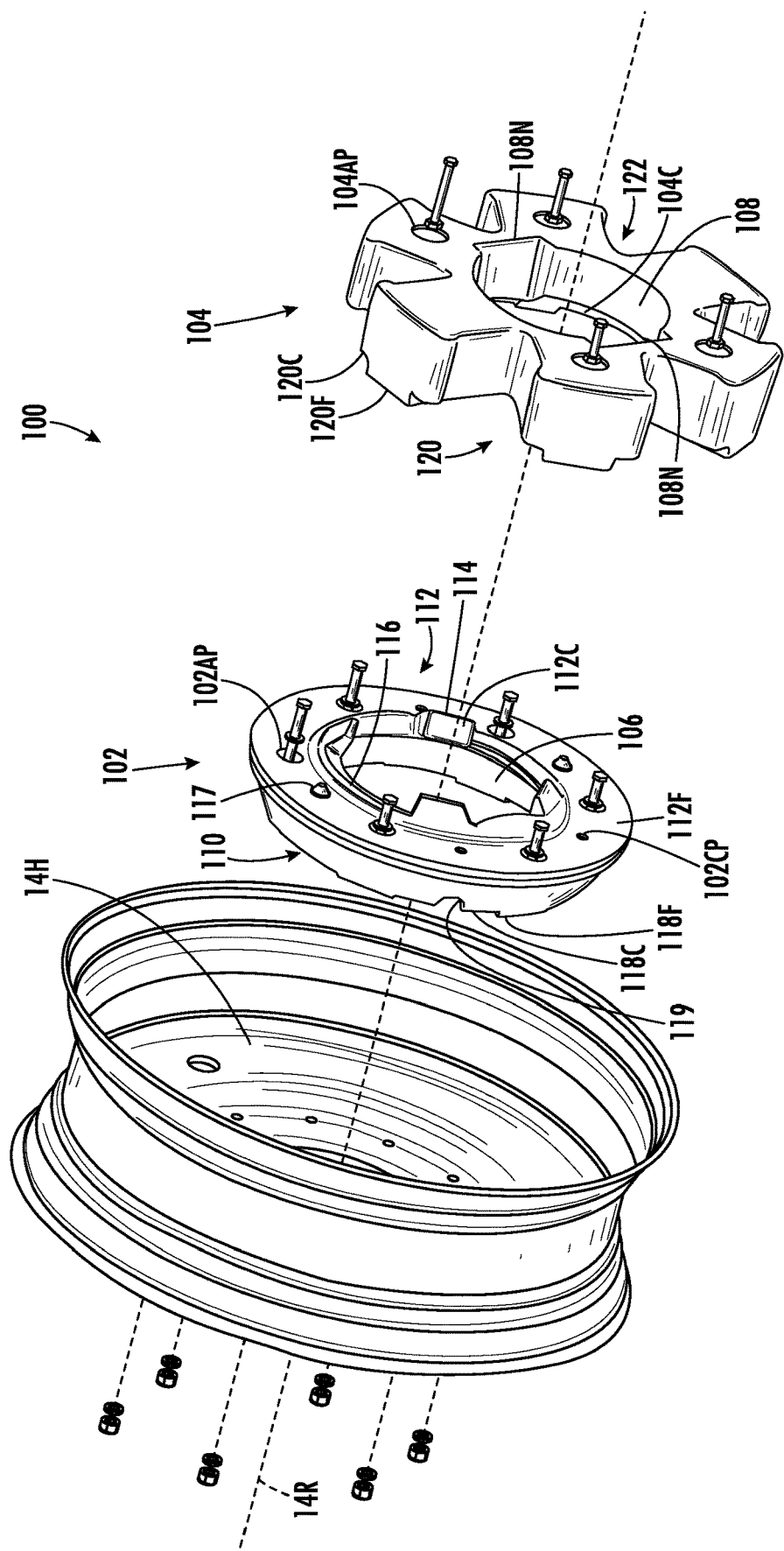
FIG. 4 illustrates an exploded, perspective view of the wheel weight system relative to a wheel center of the wheel of the agricultural work vehicle shown in FIGS. 2 and 3 in accordance with aspects of the present subject matter.
Figure 5:
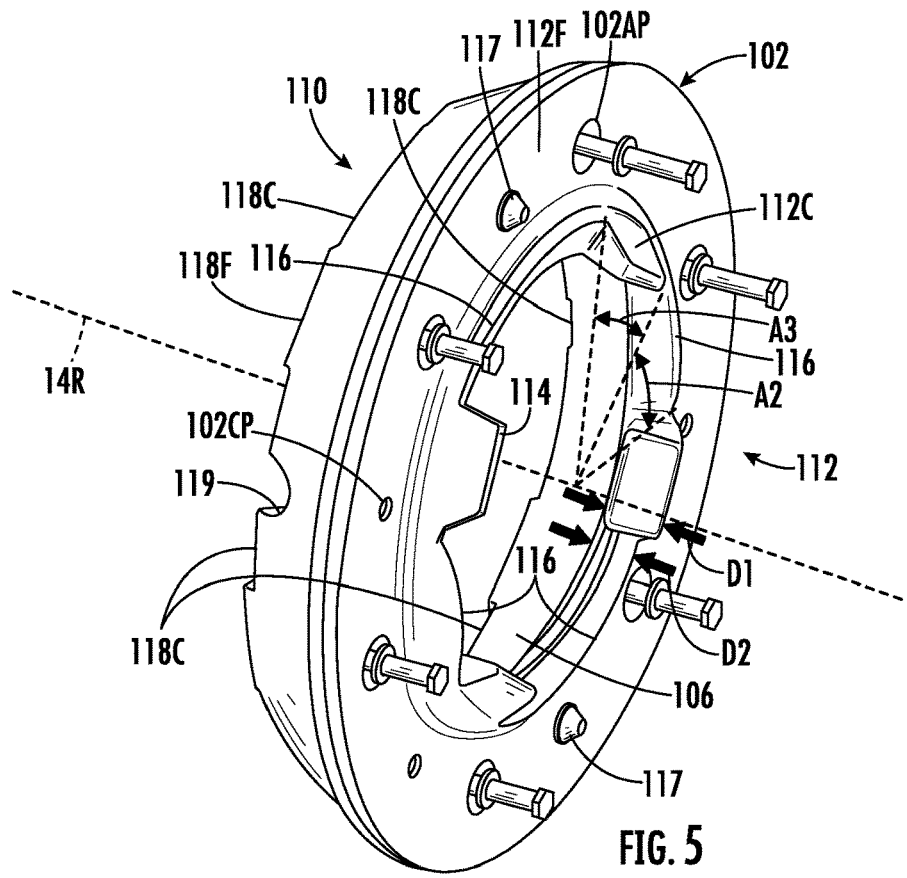
FIG. 5 illustrates a front, perspective view of a base of the wheel weight system shown in FIGS. 2 and 3 in accordance with aspects of the present subject matter.
Figure 6:
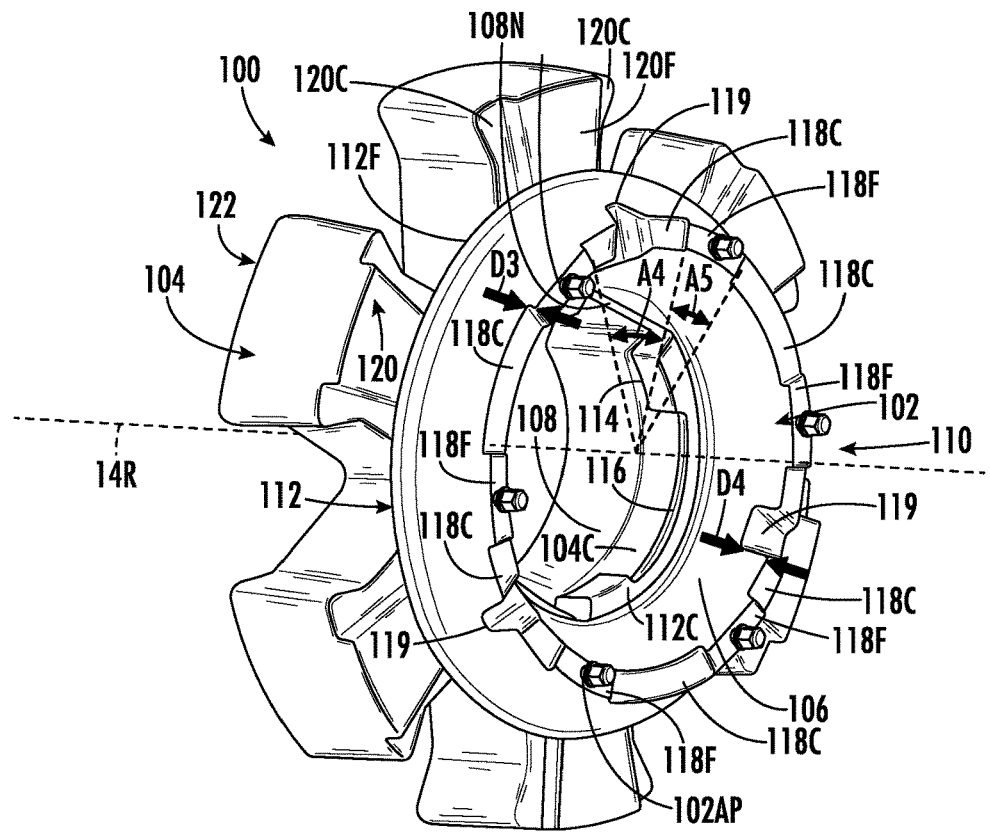
FIG. 6 illustrates a rear, perspective view of the base shown in FIG. 5 relative to a ballast weight of the wheel weight system in accordance with aspects of the present subject matter.
Figure 7:
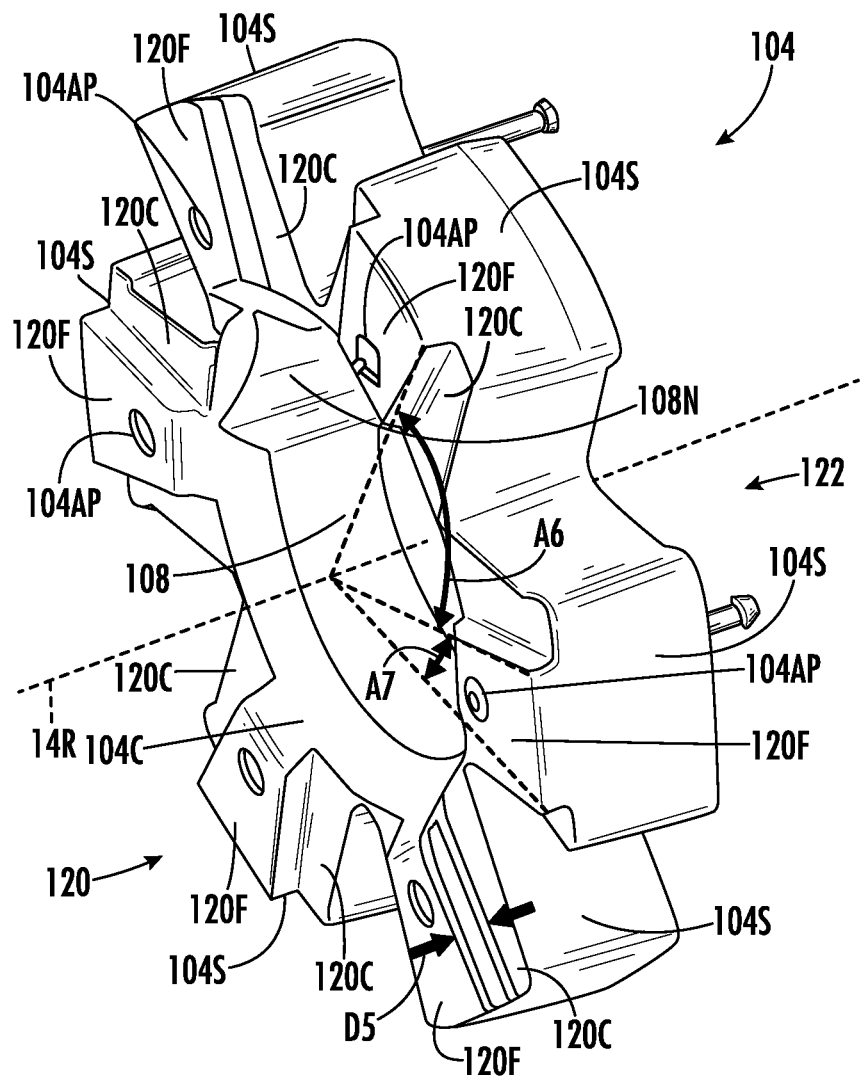
FIG. 7 illustrates a rear, perspective view of the ballast weight of the wheel weight system shown in FIG. 6 in accordance with aspects of the present subject matter.
Figure 8:
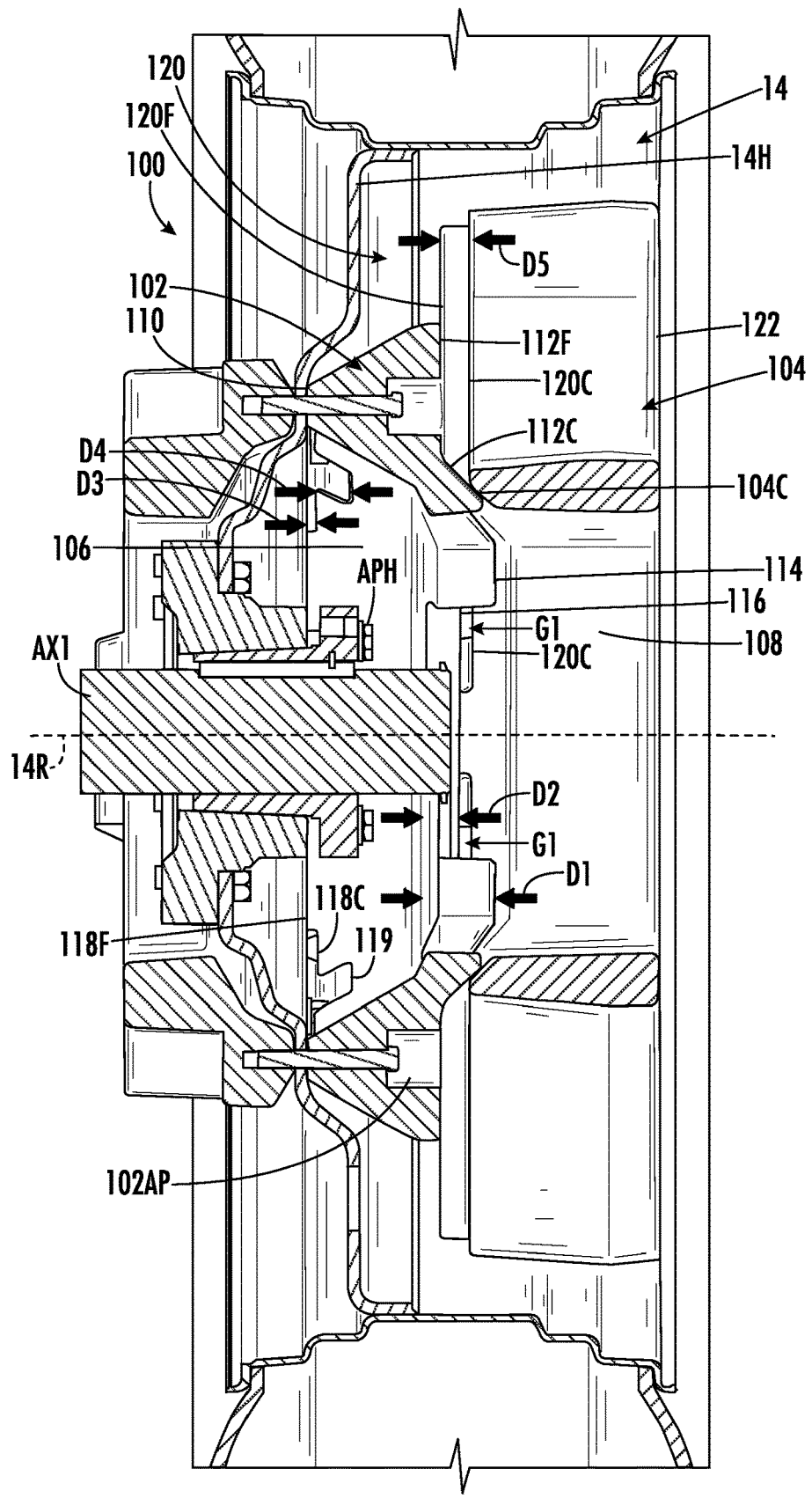
FIG. 8 illustrates a cross-sectional view of the wheel weight system shown in FIGS. 2-3 attached to the wheel of the agricultural work vehicle in accordance with aspects of the present subject matter, taken with reference to section line 8-8' in FIG. 3.
Figure 9:
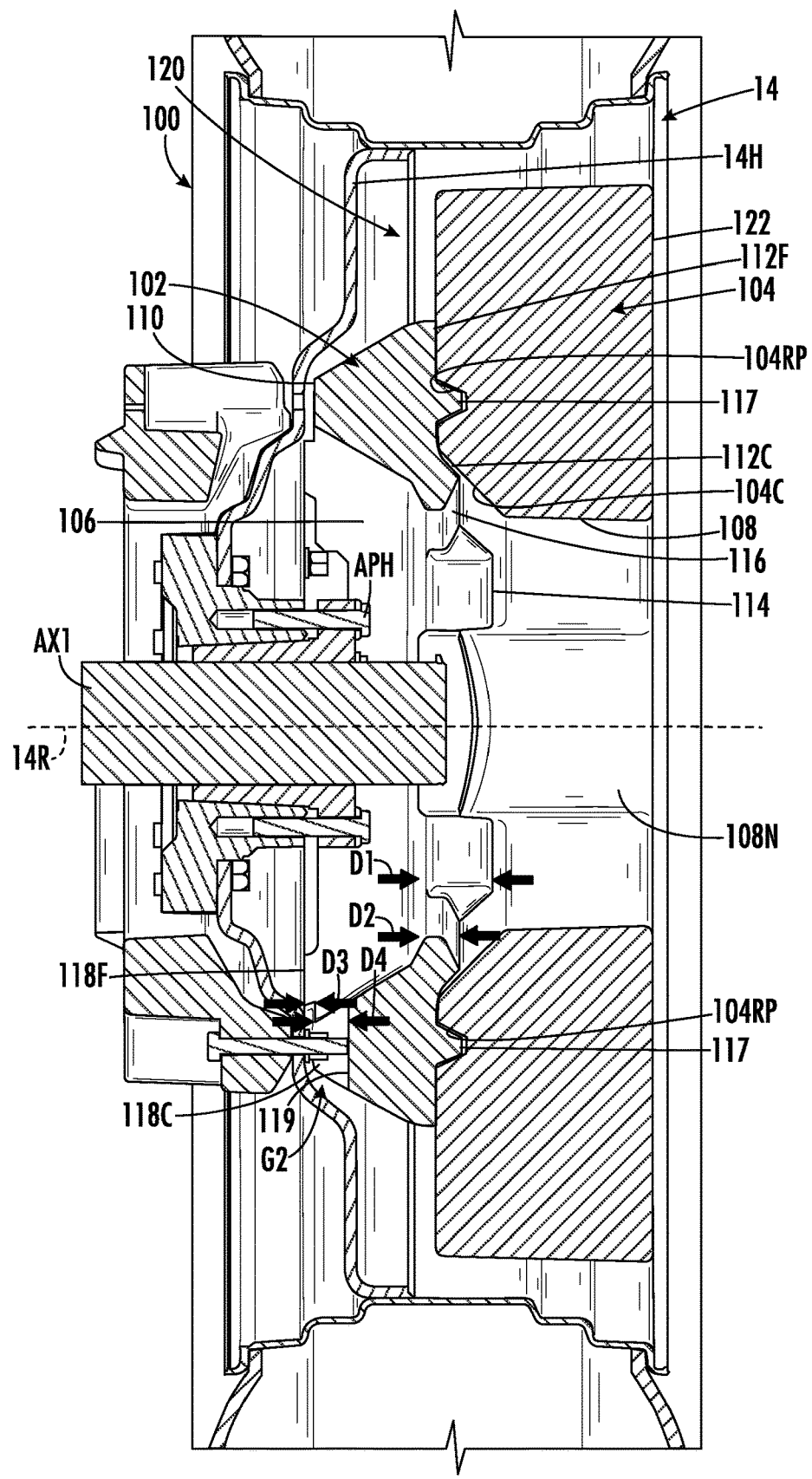
FIG. 9 illustrates a cross-sectional view of the wheel weight system shown in FIGS. 2-3 attached to the wheel of the agricultural work vehicle in accordance with aspects of the present subject matter, taken with reference to section line 9-9' in FIG. 3.

For instance, referring now to FIGS. 2-9, various views of a wheel weight system 100 are illustrated in accordance with aspects of the present subject matter. For example, FIG. 2 illustrates a perspective view of a wheel weight system attached to a wheel of an agricultural work vehicle. Similarly, FIG. 3 illustrates a front view of the wheel weight system shown in FIG. 2 attached to the wheel of the agricultural work vehicle. FIG. 4 illustrates an exploded, perspective view of the wheel weight system relative to a wheel center of the wheel of the agricultural work vehicle shown in FIGS. 2 and 3. Further, FIG. 5 illustrates a front, perspective view of a base of the wheel weight system shown in FIGS. 2 and 3 and FIG. 6 illustrates a rear, perspective view of the base shown in FIG. 5 relative to a ballast weight of the wheel weight system. Furthermore, FIG. 7 illustrates a rear, perspective view of the ballast weight of the wheel weight system shown in FIG. 6. Moreover, FIG. 8 illustrates a cross-sectional view of the wheel weight system shown in FIGS. 2-3 attached to the wheel of the agricultural work vehicle, taken with reference to section line 8-8' in FIG. 3. Additionally, FIG. 9 illustrates a cross-sectional view of the wheel weight system shown in FIGS. 2-3 attached to the wheel of the agricultural work vehicle, taken with reference to section line 9-9' in FIG. 3.

As generally shown in FIGS. 2 and 3, the wheel weight system 100 may include a base 102 and a ballast weight 104. The base 102 is couplable to an exterior facing side of a wheel center of a wheel (e.g., wheel center 14H of the rear wheel 14) such that the ballast weight 104 is easily couplable to the base 102 from an exterior facing side of the wheel. The wheel center 14H couples the wheel 14 to an axle AX1 of the vehicle 10 for rotation about a rotational axis 14R. For instance, in the illustrated embodiment, the base 102 defines a plurality of attachment points 102AP (e.g., bolt holes) extending generally parallel to the rotational axis 14R for receiving a respective, threaded bolt for coupling the base 102 to the wheel center 14H. However, it should be appreciated that the base 102 may be couplable to the wheel center 14H in any suitable manner, such as by bolts, pins, screws, rivets, clamps, and/or the like. It should additionally be appreciated that, in some instances, it may be desirable to rotate wheels such that an initially interior facing side becomes an exterior facing side (e.g., to change the orientation of a tread pattern on tires, etc.). As such, the base 102 may be configured to be couplable to whichever side of the wheel center 14H is exterior facing. For example, as shown in FIGS. 8 and 9, the base 102 is coupled to concave side of the wheel center 14H, but may be instead couplable to the opposite, convex side of the wheel center 14H.

Similarly, in the illustrated embodiments, the ballast weight 104 defines a plurality of attachment points 104AP (e.g., bolt holes) extending generally parallel to the rotational axis 14R for receiving a respective, threaded bolt which may be received in a respective coupling point 102CP (e.g., threaded hole) defined in the base 102 (e.g., as shown in FIG. 4) for coupling the ballast weight 104 to the base 102. However, it should be appreciated that the ballast weight 104 may be couplable to the base 102 in any suitable manner, such as by bolts, pins, screws, clamps, and/or the like.

In some embodiments, the attachment points 102AP (e.g., bolt holes) between the base 102 and the wheel center 14H are still accessible when the ballast weight 104 is attached to the base 102 such that the base 102 and the ballast weight 104 may be removed simultaneously from the wheel center 14H. For instance, in some embodiments, the ballast weight 104 may have a plurality of spokes 104S, where each of the spokes 104S extends radially outwardly from the rotational axis 14R. The spokes 104S may be evenly spaced apart about the rotational axis 14R by an angle A1. As such, in some embodiments, the ballast weight 104 may generally be symmetric about the rotational axis 14R. Each spoke 104S generally extends from a radially inner end to a radially outer end. In some instances, each spoke 104S has a radially inner portion IP1 extending from the radially inner end radially outwardly toward the radially outer end, and a flared portion FP1 extending radially outwardly from the inner portion IP1 to the radially outer end. The radially inner portion IP1 may have a generally constant width W1, where the flared portion FP1 may taper outwardly from the width W1 to a width W2, where the width W2 is greater than the width W1. Between each pair of directly adjacent spokes 104S about the rotational axis 14R, a gap G1 is formed through which the attachment points between the base 102 and the wheel center 14H are accessible when the ballast weight 104 is attached to the base 102. Additionally, the one or more attachment points 104AP for coupling the ballast weight 104 to the base 102 may be at least partially defined within one or more of the spokes 104S. In some instances, the attachment points 104AP are only defined in some of the spokes 104S, such as in four of the spokes 104S, as shown, or in one, two, three, or five of the spokes 104S, as will be described in greater detail below. It should be appreciated that, in other embodiments, the attachment points 102AP between the base 102 and the wheel center 14H may be at least partially hidden by the ballast weight 104 when the ballast weight 104 is attached to the base 102.

As further shown in FIGS. 2 and 3, and described in greater detail below, the base 102 includes a base through-hole 106 (FIG. 2) and the ballast plate 104 similarly includes a ballast through-hole 108, where each of the through-holes 106, 108 extend along the rotational axis 14R and allow access to attachment points APH between the wheel center 14H and the axle AX1 (e.g., between the wheel center 14H and a bearing hub on the axle AX1). In some instances, the ballast through-hole 108 may be generally circular profile in a plane perpendicular to the rotational axis 14R. In one instance, the profile of the ballast through-hole 108 may include one or more notched areas 108N which a forklift fork may engage during installation or removal of the ballast weight 104.

As more particularly shown in FIGS. 4-6 and 8-9, the base 102 extends between a first base side 110 and a second base side 112 spaced apart along the rotational axis 14R, with the first base side 110 being configured to rest against the wheel center 14H. The second base side 112 has a base end face portion 112F and a base centering portion 112C. The base centering portion 112C extends at least partially along the rotational axis 14R (along a direction parallel to the rotational axis 14R) outwardly from the base end face portion 112F towards a centering end 114, and tapering radially inwardly (increasingly toward the rotational axis 14R) from the base end face portion 112F towards the centering end 114. As best shown in FIGS. 5 and 8-9, the base centering portion 112C defines at least one centering portion cutout 116, the centering portion cutout 116 being an aperture defined through the base centering portion 112C in at least the radial direction. In some instances, such as the embodiments shown, the centering portion cutout(s) 116 is recessed from the centering end 114 and forms a generally open, u-shaped profile. However, it should be appreciated that, in other embodiments, the centering portion cutout(s) 116 may be defined as through-hole(s) or slot(s) extending through the base centering portion 112C and towards the rotational axis 14R. As will be described in greater detail below, dirt and/or other debris received in the through-hole(s) 106, 108 may exit through one or more gaps G1 (FIG. 8) at least partially defined by the centering portion cutout(s) 116, from between the base 102 and the ballast weight 104.

The base centering portion 112C extends a shorter distance from the base end face portion 112F along the rotational axis 14R at the centering portion cutout(s) 116 than adjacent to the centering portion cutout(s) 116, such that the areas of the centering portion 112C between the centering portion cutouts 116 form tabs. For example, in some instances, the base centering portion 112C extends a first distance D1 along the rotational axis 14R from the base end face portion 112F at a location circumferentially adjacent to (about the rotational axis 14R) the centering portion cutouts 116, whereas the base centering portion 112C extends a second distance D2 along the rotational axis 14R from the base end face portion 112F at the centering portion cutouts 116, where the second distance D2 is less than the first distance D1.

In some instances, when there are multiple centering portion cutouts 116, the centering portion cutouts 116 are evenly spaced apart about the rotational axis 14R. In one instance, the base centering portion 112C includes four centering portion cutouts 116, where each of the centering portion cutouts 116 extends across an angular range A2 (FIG. 5) about the rotational axis 14R, and each of the tabs formed between the centering portion cutout(s) 116 and defining the centering end 114 extends across an angular range A3. In one embodiment, the sum of the angular ranges A2 of the centering portion cutouts 116 may cumulatively extend across a greater angular range about the rotational axis 14R than the sum of the angular ranges A3 of the tabs formed between the centering portion cutout(s) 116. In other words, the centering portion cutouts 116 extend over a greater cumulative angular range about the rotational axis 14R than the portions of the centering end 114 such that debris is allowed to exit across a majority of rotational positions of wheel weight system 100 about the rotational axis 14R. In some instances, the centering portion cutout(s) 116 are sized to receive a forklift fork. It should be appreciated that the base centering portion 112C may include any other suitable number of centering portion cutouts 116, such as one, two, three, five, six, and/or the like centering portion cutouts 116.

In some embodiments, the base 102 additionally includes one or more features for rotationally aligning the ballast weight 104 about the rotational axis 14R during installation to help an operator more easily align the coupling points 102CP and the attachment points 104AP. For instance, as shown in FIGS. 5-6 and 9, the base 102 includes one or more protrusions 117 configured to be received within corresponding recesses in the ballast weight 104. For example, the protrusion(s) 117 may be formed on the base end face portion 112F of the base 102, where each of the protrusion(s) 117 may align with a respective one of the attachment points 104AP or with a respective recess 104RP (FIG. 7). In the illustrated embodiment, for example, there are two protrusions 117 and four coupling points 102CP spaced apart about the rotational axis 14R on the base end face portion 112F such that each of the protrusions 117 aligns with a respective recess 104RP and each of the coupling points 102CP aligns with a respective attachment point 104AP in at least one rotational position of the ballast weight 104 about the rotational axis 14R. For instance, the protrusions 117 and the coupling points 102CP may be evenly spaced apart about the rotational axis 14R on the base end face portion 112F, with the protrusions 117 being positioned 180 from each other about the rotational axis 14R, and the attachment point 104AP and the recesses 104RP may be correspondingly evenly spaced apart about the rotational axis 14R on the ballast weight 104, with the recesses 104RP being positioned 180 from each other about the rotational axis 14R, such that the ballast weight 104 may be coupled to the base 102 in two rotational positions about the rotational axis 14R.

By including the recesses 104RP for receiving the protrusions 117, which do not extend through the ballast weight 104 like the attachment points 104AP, an operator cannot try to insert attachment means (e.g., bolts, screws, pins, and/or the like) into attachment points 104AP that have received the protrusions 117, which reduces frustration when installing the ballast weight 104 on the base 102. However, the attachment points 104AP may alternatively be positioned on each spoke 104S, such that the protrusions 117 may be simply received in one of the attachment points 104AP, which would increase the number of angular positions in which the ballast weight 104 may be installed on the base 102. It should be appreciated that the protrusions 117 may instead, or additionally, be formed on the ballast weight 104 and configured to be received within recesses (e.g., coupling points 102CP) of the base 102.

As further shown in FIGS. 4-6 and 8-9, the base 102 may further define one or more cutouts at the first base side 110, where dirt and/or other debris received in the through-hole (s) 106, 108 may also exit from between the base 102 and the wheel center 14H. For instance, the first base side 110 may define a wheel-end contact face 118F and a wheel-end cutout face 118C, with the wheel-end cutout face 118C being at least partially spaced apart from the wheel-end contact face 118F along the rotational axis 14R towards the second base side 112. For example, as particularly shown in FIGS. 6 and 8-9, the wheel-end cutout face 118C is recessed by a first recessed distance D3 along the rotational axis 14R from the wheel-end contact face 118F. In some instances, the wheel-end cutout face 118C may include at least one further recessed portion 119, which is recessed from the wheel-end cutout face 118C by an additional recessed distance D4. In general, the wheel-end contact face 118F is configured to rest against the wheel center 14H when the base 102 is coupled to the wheel center 14H such that debris is allowed to exit the base through-hole 106 along the radial direction from between the wheel-end cutout face 118C and the wheel center 14H, particularly through one or more gaps G2 (FIG. 9) at least partially defined by the wheel-end cutout face 118C and the wheel center 14H.

As best shown in FIG. 6, the wheel-end cutout face 118C may be formed in sections spaced apart about the rotational axis 14R, with each of the sections extending across an angular range A4 and interspaced by sections of the wheel-end contact face 118F, each of which extend across an angular range A5. In some instances, the portions of wheel-end cutout face 118C with a respective one of the additional recessed portion(s) 119 may be interspaced or spaced apart by portions of the wheel-end cutout face 118C without a respective one of the additional recessed portion(s) 119. For example, in one instance, the first base side 110 includes six portions of the wheel-end cutout face 118C, where three of the six portions include an additional recessed portion 119 and alternate with portions of the wheel-end cutout face 118C without the additional recessed portions 119 about the rotational axis 14R. However, it should be appreciated that the first base side 110 may include any other suitable number of portions of the wheel-end cutout face 118C, such as one, two, three, four, five, seven, and/or the like portions of the wheel-end cutout face 118C. In one embodiment, the sum of the angular ranges A4 of the sections of the wheel-end cutout face 118C may be cumulatively larger than the sum of the angular ranges A5 of the sections of the wheel-end contact face 118F such that debris is allowed to exit across a majority of rotational positions of the base 102 about the rotational axis 14R.

As shown in FIGS. 4 and 6-9, the ballast weight 104 may similarly extend between a first ballast side 120 and a second ballast side 122 spaced apart along the rotational axis 14R, with the first ballast side 120 being configured to rest against the base end face portion 112F of the base 102 when installed on the base 102. More particularly, the first ballast side 120 defines a ballast end contact face 120F and a ballast cutout face 120C, with the ballast cutout face 120C being at least partially spaced apart from the ballast end contact face 120F along the rotational axis 14R in the direction of (towards) the second ballast side 122. For instance, as shown in FIGS. 7 and 8, the ballast cutout face 120C is spaced apart from the ballast end contact face 120F by a distance D5 along the rotational axis 14R. The ballast end contact face 120F is configured to rest against the base end face portion 112F of the base 102 and the ballast cutout face 120C is configured to be at least partially spaced apart from the base end face portion 112F of the base 102 when the ballast weight 104 is installed on the base 102.

In the illustrated embodiment, the ballast end contact face 120F and the ballast cutout face 120C have multiple sections. For instance, the ballast weight 104 may include a plurality of spokes 104S, where the ballast end contact face 120F and the ballast cutout face 120C may be split across the spokes 104S. More particularly, in some instances, each of the spokes 104S may have one or more sections of the ballast end contact face 120F and one or more sections of the ballast cutout face 120C. For example, as particularly shown in FIG. 7, each spoke 104S has a portion of the ballast end contact face 120F flanked on both circumferential sides by two portions of the ballast cutout face 120C. In one instance, circumferentially adjacent portions of the ballast cutout face 120C on directly circumferentially adjacent spokes 104S may be at least partially connected to form a continuous surface between the spokes 104S. In such embodiment, each portion of the ballast cutout face 120C may extend across an angular range A6 about the rotational axis 14R and each portion of the ballast end contact face 120F may extend across an angular range A7 about the rotational axis 14R. In some instances, the sum of the angular ranges A6 of the portions of the ballast cutout face 120C cumulatively extends across a greater range about the rotational axis 14R than the sum of the angular ranges A7 of the portions of the ballast end contact face 120F. In other words, the ballast cutout face 120C cumulatively extends across a greater range about the rotational axis 14R than the ballast end contact face 120F. However, it should be appreciated that the ballast cutout face 120C and the ballast end contact face 120F may have any other suitable configuration on the first ballast side 120.

As discussed above, the ballast weight 104 may be configured to at least partially receive the base centering portion 112C of the base 102. For instance, in some embodiments, the first ballast side 120 further includes a ballast centering portion 104C shown in FIGS. 4 and 6-9, where the ballast centering portion 104C extends from the ballast end contact face 120F and the ballast cutout face 120C towards an end of the through-hole 108 along the rotational axis 14R, and tapering radially inwardly (increasingly radially inwardly towards the rotational axis 14R). The ballast centering portion 104C generally surrounds the through-hole 108 and is configured to be guided on the base centering portion 112C of the base 102 to assist in bringing the ballast weight 104 into centering alignment with the base 102. For instance, the profile of the ballast centering portion 104C is generally configured to mate or nest with the profile of the base centering portion 112C when the ballast weight 104 is attached to the base 102. For example, the ballast centering portion 104C and the base centering portion 112C may have domed profiles extending from the perimeter of the respective through-hole 106, 108 which are configured to at least partially nest.

When the ballast weight 104 is coupled to the base 102, one or more of the centering portion cutout(s) 116 of the base 102 at least partially aligns with the ballast cutout face 120C circumferentially about the rotational axis 14R to form one or more of the gaps G1 (FIG. 8), to allow debris to exit the base through-hole 106 and the ballast through-hole 108 at least partially along the radial direction (perpendicular to the rotational axis 14R) between the centering portion cutout 112C and the ballast cutout face 120C. For instance, the angular range A6 (FIG. 7) of the ballast cutout face 120C is selected to at least partially overlap circumferentially with the angular range A2 (FIG. 5) of the centering portion cutout(s) 116 when the ballast weight 104 is coupled to the base 102. In some instances, the ballast cutout face 120C extends radially outwardly from the ballast centering portion 104C to the outer perimeter of the ballast weight 104 to guide any debris from the ballast through-hole 108 fully out of the ballast weight 104. However, it should be appreciated that the ballast cutout face 120 may extend part of the radial distance between the ballast centering portion 104C to the outer perimeter of the ballast weight 104 when the spokes 104S are present, as debris may exit from the through-holes 106, 108 from the gap(s) G1 then exit from between the spokes 104S.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wheel weight system for an agricultural vehicle, the wheel weight system comprising:
    a base configured to be coupled to a wheel of the agricultural vehicle, the base extending between a first base side and a second base side along a rotational axis and defining a base through-hole extending along the rotational axis, the first base side being configured to rest against the wheel, the second base side having a base end face portion and a base centering portion, the base centering portion extending outwardly along the rotational axis from the base end face portion to a centering end and tapering radially inwardly from the base end face portion, the base centering portion defining a centering portion cutout; and
    a ballast weight configured to be coupled to the base, the ballast weight extending between a first ballast side and a second ballast side along the rotational axis and defining a ballast through-hole extending along the rotational axis, the first ballast side defining a ballast end contact face and a ballast cutout face, the ballast cutout face being spaced apart from the ballast end contact face along the rotational axis towards the second ballast side, the ballast weight being configured to at least partially receive the base centering portion of the base such that the base through-hole and the ballast through-hole are aligned along the rotational axis and the centering portion cutout of the base is at least partially aligned with the ballast cutout face circumferentially about the rotational axis to allow debris to exit the base through-hole and the ballast through-hole along a radial direction between the centering portion cutout and the ballast cutout face.

2. The wheel weight system of claim 1, wherein the base centering portion extends outwardly from the base end face portion across a first distance along the rotational axis at a location circumferentially adjacent the centering portion cutout about the rotational axis, and
    wherein the centering portion cutout extends outwardly from the base end face portion across a second distance along the rotational axis at the centering portion cutout, the second distance being less than the first distance.

3. The wheel weight system of claim 1, wherein the centering portion cutout is defined by an aperture extending through the base centering portion along at least the radial direction.

4. The wheel weight system of claim 1, wherein the first ballast side of the ballast weight further defines a ballast centering portion, the ballast centering portion tapering radially inwardly from the ballast end contact face and the ballast cutout face towards the second ballast side, the ballast centering portion being configured to at least partially receive the base centering portion of the base.

5. The wheel weight system of claim 4, wherein the ballast cutout face extends from the ballast centering portion to an outer perimeter of the ballast weight along the radial direction.

6. The wheel weight system of claim 1, wherein the ballast end contact face is configured to rest against the base end face portion when the ballast weight is coupled to the base.

7. The wheel weight system of claim 1, wherein the centering portion cutout extends across a first angular range about the rotational axis, and
    wherein the ballast cutout face extends across a second angular range about the rotational axis, the second angular range at least partially overlapping the first angular range.

8. The wheel weight system of claim 1, wherein the centering portion cutout of the base is one of a plurality of centering portion cutouts of the base, the plurality of centering portion cutouts extending across a greater angular range about the rotational axis than the centering end of the base.

9. The wheel weight system of claim 1, wherein the ballast cutout face of the ballast weight has a plurality of sections, the plurality of sections of the ballast cutout face extending across a greater angular range about the rotational axis than the ballast end contact face.

10. The wheel weight system of claim 1, wherein the first base side of the base defines a wheel-end contact face and a wheel-end cutout face, the wheel-end cutout face being spaced apart from the wheel-end contact face along the rotational axis towards the second base side, the wheel-end contact face being configured to rest against the wheel when the base is coupled to the wheel such that debris is allowed to exit the base through-hole along the radial direction between the wheel-end cutout face and the wheel.

11. An agricultural vehicle, comprising:
    a chassis;
    a wheel supporting the chassis, the wheel comprising a wheel center rotatably coupling the wheel to the chassis for rotation about a rotational axis;
    a base coupled to the wheel center, the base extending between a first base side and a second base side along the rotational axis and defining a base through-hole extending along the rotational axis, the first base side being configured to rest against the wheel center, the second base side having a base end face portion and a base centering portion, the base centering portion extending outwardly along the rotational axis from the base end face portion to a centering end and tapering radially inwardly from the base end face portion, the base centering portion defining a centering portion cutout; and a ballast weight coupled to the base, the ballast weight extending between a first ballast side and a second ballast side along the rotational axis and defining a ballast through-hole extending along the rotational axis, the first ballast side defining a ballast end contact face and a ballast cutout face, the ballast cutout face being spaced apart from the ballast end contact face along the rotational axis towards the second ballast side, the ballast weight being configured to at least partially receive the base centering portion of the base such that the base through-hole and the ballast through-hole are aligned along the rotational axis and the centering portion cutout of the base is at least partially aligned with the ballast cutout face circumferentially about the rotational axis to allow debris to exit the base through-hole and the ballast through-hole along a radial direction between the centering portion cutout and the ballast cutout face.

12. The agricultural vehicle of claim 11, wherein the base centering portion extends outwardly from the base end face portion across a first distance along the rotational axis at a location circumferentially adjacent the centering portion cutout about the rotational axis, and wherein the centering portion cutout extends outwardly from the base end face portion across a second distance along the rotational axis at the centering portion cutout, the second distance being less than the first distance.

13. The agricultural vehicle of claim 11, wherein the centering portion cutout is defined by an aperture extending through the base centering portion along at least the radial direction.

14. The agricultural vehicle of claim 11, wherein the first ballast side of the ballast weight further defines a ballast centering portion, the ballast centering portion tapering radially inwardly from the ballast end contact face and the ballast cutout face towards the second ballast side, the ballast centering portion being configured to at least partially receive the base centering portion of the base.

15. The agricultural vehicle of claim 14, wherein the ballast cutout face extends from the ballast centering portion to an outer perimeter of the ballast weight along the radial direction.

16. The agricultural vehicle of claim 11, wherein the ballast end contact face is configured to rest against the base end face portion when the ballast weight is coupled to the base.

17. The agricultural vehicle of claim 11, wherein the centering portion cutout extends across a first angular range about the rotational axis, and wherein the ballast cutout face extends across a second angular range about the rotational axis, the second angular range at least partially overlapping the first angular range.

18. The agricultural vehicle of claim 11, wherein the centering portion cutout of the base is one of a plurality of centering portion cutouts of the base, the plurality of centering portion cutouts extending across a greater angular range about the rotational axis than the centering end of the base.

19. The agricultural vehicle of claim 11, wherein the ballast cutout face of the ballast weight has a plurality of sections, the plurality of sections of the ballast cutout face extending across a greater angular range about the rotational axis than the ballast end contact face.

20. The agricultural vehicle of claim 11, wherein the first base side of the base defines a wheel-end contact face and a wheel-end cutout face, the wheel-end cutout face being spaced apart from the wheel-end contact face along the rotational axis towards the second base side, the wheel-end contact face being configured to rest against the wheel center when the base is coupled to the wheel center such that debris is allowed to exit the base through-hole along the radial direction between the wheel-end cutout face and the wheel center.

* * * * *